United States Patent Office 3,427,144
Patented Feb. 11, 1969

3,427,144
FERTILIZER COMPRISING UREA AND
NITRILOTRIACETONITRILE
Charles Kapar, Brooklyn, N.Y., assignor, by mesne assignments, to W. R. Grace & Company, New York, N.Y., a corporation of Connecticut
No Drawing. Filed Oct. 7, 1965, Ser. No. 493,894
U.S. Cl. 71—28                                    2 Claims
Int. Cl. C05c 9/00, 13/00

ABSTRACT OF THE DISCLOSURE

A fertilizer composition comprising a mixture of urea and nitrilotriacetonitrile which is characterized by slow-release properties.

---

This invention relates to urea-containing compositions, and more particularly to urea-containing compositions of reduced solubility rate in water.

Urea is commonly employed in fertilizer preparations as a nitrogen source. It is found however that, in view of the high water solubility of urea, its effectiveness is not long lasting, and it is capable of overfertilizing which is detrimental to the well being of many forms of vegetation. In order to secure a more gradual, prolonged release of urea, various attempts have been made to alter its physical form by use of coatings and adsorbents. Such expedients however are of limited effectiveness and contribute significantly to the cost of the fertilizer preparation.

It is an object of this invention to provide a urea composition of reduced solubility rate in water. It is another object of this invention to provide an economical urea composition of reduced solubility rate in water unimpaired for use as a fertilizer ingredient. Other objects and advantages will appear hereinafter.

The objects of this invention are accomplished in general by providing compositions comprising 70–98% urea and 2–30% nitrilotriacetonitrile. Said compositions are preferably prepared by melt blending the two ingredients at a temperature of 133° C. and minimum time necessary to secure a uniform molten blend. Melt blending is preferably carried out in the absence of oxygen and moisture. Urea which initially contains water is preferably dried while molten, prior to addition of the nitrilotriacetonitrile. The molten blend is then cooled and comminuted to an appropriate particle size. Other methods may however also be employed for the production of the compositions of this invention. For example, the nitrilotriacetonitrile may be added to the urea during a crystallization operation.

Although there is no clearly evident theoretical explanation for the unexpected results herein obtained, it is felt that the symmetric polyfunctional nitrilotriacetonitrile forms some sort of additional compound or complex with the urea. In this form, the nitrilotriacetonitrile not only diminishes the rate of water solubility of the urea, but is also found to be readily hydrolyzable under normal soil conditions, yielding ammonia and nitrilotriacetic acid. The ammonia is directly utilizable by growing vegetation and the nitrilotriacetic acid serves as a chelating agent which will solubilize mineral ingredients of the soil, thereby making them more readily available to the vegetation.

Nitrilotriacetonitrile concentrations below about 2% do not produce a detectable effect in the urea compositions with respect to retardation of rate of solution. At concentrations above 30% nitrilotriacetonitrile, the compositions become deficient in urea content. The compositions of this invention, in solid comminuted form may be incorporated into balanced standard fertilizer formulations for use on edible crops, grasses and other forms of vegetation. The compositions may also be used alone as fertilizers, or in any other uses for urea requiring retarded solvency in water, or in non-aqueous applications such as clathration or formation of inclusion compounds. In specialized uses such as in resin formation with formaldehyde, or other uses, other active or inert ingredients may be included in the composition.

For purposes of the present invention, the solubilities of the compositions are determind by ascertaining the percent retardation of the rate of solution in water. The test is carried out by adding 100 grams of the urea nitrilotriacetonitrile composition in 20 mesh size to 100 grams water at 17° C. in a one liter flask. The stoppered flask is shaken on a machine at 130 shakes per minute, and the time to complete dissolution for the sample is noted, along with the dissolution time for a control sample of pure urea subjected to the same test. The percent retardation is the additional time taken for dissolution of the sample as compared with the control sample, expressed as the percent of the time required by the control sample. Thus, if the control requires 3.3 minutes for complete dissolution, and the test sample requires 3.5 minutes, the degree of solubility retardation is 6%. In cases where large amounts of nitrilotriacetonitrile are present, residual insoluble material may persist. In such cases the time required for dissolution is taken as the time to reach the amount of persistent residue, as may be determined by comparing the residue with a previously dissolved sample of the same nitrilotriacetonitrile content.

The compositions of this invention, as well as methods for their preparation, may be more fully understood from the following examples which are offered by way of illustration and not by way of limitation.

Example 1

A series of compositions of the present invention were prepared by mixing together in anhydrous form predetermined weights of urea and nitrilotriacetonitrile. The melting was done in a pyrex flask provided with thermometer, stirrer, gas inlet and outlet means, and an external heating mantle. The mixtures, under a blanketing flow of nitrogen, were rapidly heated to 133° C. and maintained at this temperature with good agitation for just sufficient time to form a homogeneous mixture, said time requirement varying from 30 seconds to three minutes, the longer times being required with the higher proportions of nitrilotriacetonitrile. The molten compositions were rapidly cooled by pouring from the flask into chilled molds. The solidified compositions were then ground to approximately 20 mesh size and subjected to a size classification. Samples taken for testing were of such particle size that the particulate material would pass through a standard 15 mesh screen but were retained by a 20 mesh screen. The samples prepared and their percent retardation of rate of solution in water are presented in Table I below.

Table I

| Percent nitrilotri-acetonitrile: | Percent retardation of rate of soluiton |
|---|---|
| 1.0 | 0 |
| 2.0 | 5 |
| 5.0 | 8 |
| 10.0 | 12 |
| 20.0 | 16 |
| 30.0 | 21 |

As the results of Table I indicate, amounts of nitrilotriacetonitrile below 2% do not exert a detectable affect on the solubility of the composition.

The compositions, when applied uniformly to turf grasses were found to produce the usual beneficial effects characteristic of urea, but were observed to be less prone to "burning" or localized over-fertilization. The compositions having the higher contents of nitrilotriacetonitrile provided noticeably longer lasting effects.

Example II

Compositions of the present invention were prepared by crystallizing aqueous solutions of a mixture of urea and nitrilotriacetonitrile. The two ingredients were separately dissolved prior to blending and crystallizing. The urea was prepared as a saturated solution at 100° C. The nitrilotriacetonitrile was prepared as a saturated solution at 105° C. The separate solutions were then mixed in appropriate amounts, and the mixture cooled to 0° C. to effect crystallization. The crystals were filtered off, dried, and classified to 20 mesh size prior to testing for rate of retardation of solubility. The ratio of ingredients in the crystals was verified by analysis. In general the crystals would contain a somewhat lower urea content than that of the mixture solution prior to crystallization. The samples tested, and results obtained are presented in Table II below.

Table II

| Percent nitrilotri-acetonitrile: | Percent retardation of rate of solution |
|---|---|
| 2.2 | 4 |
| 5.4 | 7 |
| 11.7 | 11 |
| 21.3 | 13 |
| 29.8 | 17 |

Although the foregoing invention has been described in some detail by way of illustration and example for purposes of clarity and understanding, it is understood that certain changes and modifications may be practiced within the spirit of the invention as limited only by the scope of the appended claims.

What is claimed is:

1. A composition comprising about 70 to 98% urea and about 2 to 30% nitrilotriacetonitrile.

2. A solid comminuted melt blended composition comprising urea and nitrilotriacetonitrile.

References Cited

UNITED STATES PATENTS

| 2,816,129 | 12/1957 | Montgomery | 260—465.5 |
| 2,855,428 | 10/1958 | Singer et al. | 260—465.5 |
| 3,061,628 | 10/1962 | Singer et al. | 260—465.5 |
| 3,245,776 | 4/1966 | Rubin | 71—28 |

OTHER REFERENCES

Rinehart, Herbert W.; Beta-Hydroformamine Cyanide: A New Method of Synthesis Which Reveals its Molecular Structure. J. Am. Chem. Soc. 48: 2794–2798 (1926).

S. LEON BASHORE, *Acting Primary Examiner.*

T. G. FERRIS, *Assistant Examiner.*

U.S. Cl. X.R.

71—30, 64; 260—465.5